Dec. 27, 1960

E. V. HARDWAY, JR 2,966,617

ACCELERATION RESPONSIVE DEVICES

Original Filed Sept. 5, 1956

INVENTOR
*Edward V. Hardway Jr.*

BY

ATTORNEY

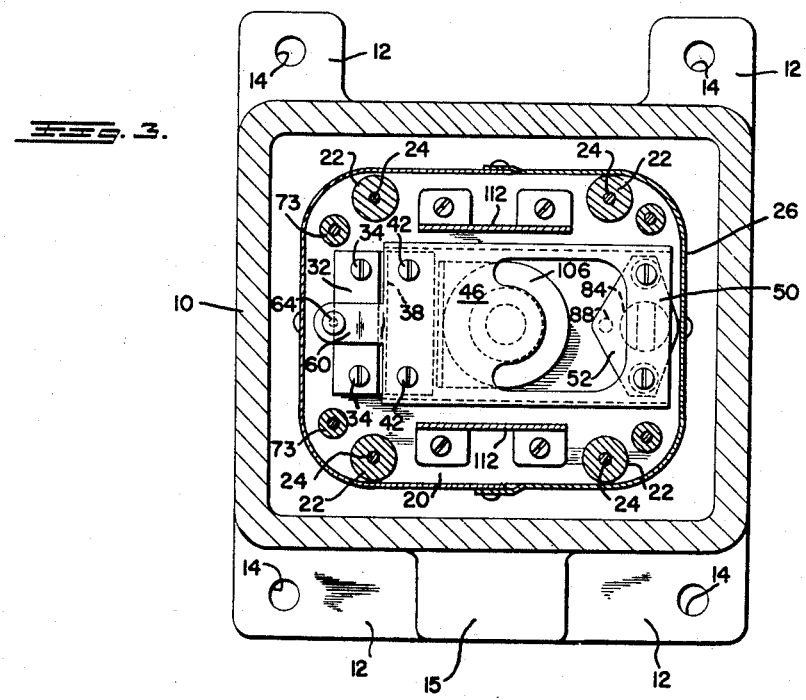
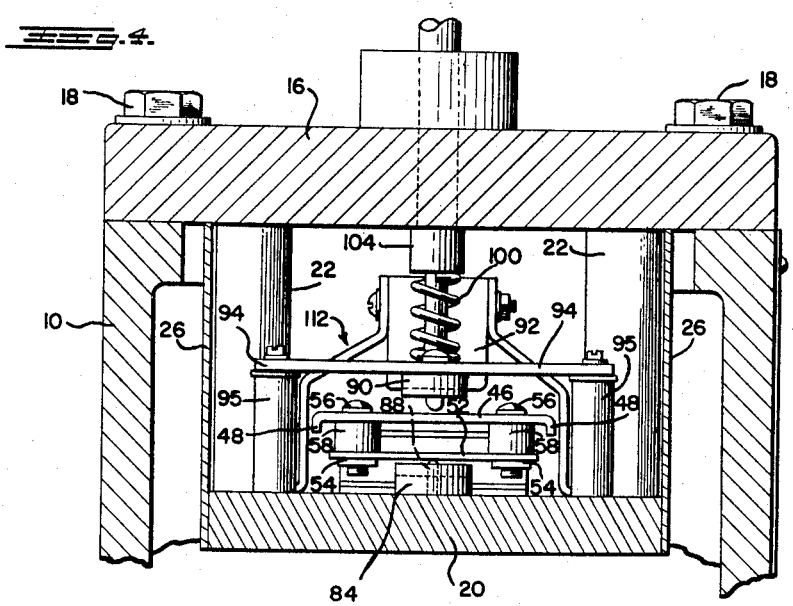

Dec. 27, 1960      E. V. HARDWAY, JR      2,966,617
ACCELERATION RESPONSIVE DEVICES

Original Filed Sept. 5, 1956      4 Sheets-Sheet 3

INVENTOR
Edward V. Hardway Jr.

BY

ATTORNEY

Dec. 27, 1960    E. V. HARDWAY, JR    2,966,617
ACCELERATION RESPONSIVE DEVICES
Original Filed Sept. 5, 1956    4 Sheets-Sheet 4

INVENTOR
Edward V. Hardway Jr.

BY
ATTORNEY

2,966,617

ACCELERATION RESPONSIVE DEVICES

Edward V. Hardway, Jr., Houston, Tex., assignor to Robertshaw-Fulton Controls Company, Richmond, Va., a corporation of Delaware Original application Sept. 5, 1956, Ser. No. 608,148. Divided and this application Feb. 19, 1958, Ser. No. 716,245

6 Claims. (Cl. 317—5)

This invention relates to acceleration responsive devices and in one of its aspects to a system which can be employed to widen the scope of application of such devices. In particular, the invention is concerned with acceleration responsive devices wherein a movable element is subjected to opposed magnetic and mechanical forces.

This application is a division of my co-pending application Serial No. 608,148, filed September 5, 1956.

Devices of the general type with which my invention is concerned employ a fixed permanent magnet and a movably supported armature which is attracted to the magnet. In the usual case, a spring exerts a force in opposition to the magnetic couple between the magnet and the armature. The spring force is chosen to be somewhat less than the force exerted by the magnetic couple when the elements are in contact and the difference between the respective forces represents the minimum external acceleration which must be applied to the device to break the movable element free of the magnetic couple.

One problem encountered by such devices is the necessity of achieving a perfectly flat face to face contact between the magnet and the movable element. Where face to face contact is employed, extreme care is required to exclude foreign particles from entry between the faces since such particles prevent the desired contact and thus change the sensitivity characteristics of the device.

In addition to careful machining and alignment of parts, the movable element must also be constrained in such a manner that it returns to the magnet each time in exactly the same relationship. Adequate constraint of movement is often achieved only by altering the desired frequency response of the device thus requiring a design compromise. Even with these precautions the sensitivity of the device may vary over a series of actuations because the strength of the magnetic couple is extremely sensitive to the relative position of the two contacting elements.

One object of my invention is to provide an acceleration responsive device having improved sensitivity characteristics which remain constant over repeated actuations of the device.

Another object of my invention is to provide an acceleration responsive device which is accurately responsive to peak acceleration over a wide frequency range.

Another object of my invention is to provide an acceleration responsive device accurately responsive to peak accelerations of extremely low magnitude.

Another object of my invention is to provide an acceleration responisve device wherein the relative movement of component parts is controlled with a high degree of precision and which does not require the precise machining heretofore necessary.

It is another object of my invention to provide an acceleration responsive device having a sensitivity characteristic which may be easily adjusted with a high degree of precision.

Since the devices described above are essentially "single response" devices, i.e., responsive to a peak disturbance, regardless of the duration of the disturbance, their application has been somewhat restricted. Accordingly, it is another object of my invention to provide a control system wherein a "single response" device may be employed to respond to only those external or malfunction conditions which persist over a given period of time.

The foregoing, and other objects, are achieved in an acceleration responsive device in which a rigid armature is supported upon a frame by a substantially frictionless pivotal mounting which constrains the armature to a single degree of freedom of movement relative to the frame.

A permanent magnet may be mounted upon the frame in the path of movement of the distal end of the armature. The armature is biased away from the magnet by a spring. To avoid the necessity of accurate machining of the magnet and armature faces, the magnetically maintained position of the armature is established by a stop which engages the armature at a single point to define a limit of movement of the armature toward the magnet at a location spaced from the magnet but within a distance thereof where the magnetic force is sufficient to overcome the opposing spring force. This single point engagement eliminates any frictional resistance to separation of the pin and armature. Torsional vibrations of the armature are prevented by locating the pin so that it engages the armature on its longitudinal center line. These structural features insure consistent response to low values of acceleration over a wide range of frequencies and particularly at high vibration frequencies.

Adjustment of the sensitivity of the device is accomplished by adjusting either the spring force or the air gap between the armature and the magnet, or both. An electrical reset coil is operable both to move the armature to the magnetically maintained or "set" position and to maintain the armature at this position even when substantial accelerations are applied to the device. This latter feature enables the device to be rendered insensitive when desired, as during a period where abnormal accelerations other than a malfunction condition are encountered; for example, the starting of a motor.

In one form of control system, actuation of the acceleration responsive device conditions a circuit to energize the reset coil and simultaneously apply a pulse of current to a device connected to perform the desired control function. The last mentioned device has characteristics such that it may be set to operate only after a repeated number of actuations of the acceleration responsive device have occurred within a time interval dependent upon the rate at which said device moves toward an actuation point when energized and the rate at which said device recovers toward a normal condition when de-energized. Such a system enables a detecting device responsive to a peak condition to actuate a control only after the abnormal condition persists over a period of time. Thus, the system ignores single or transient accelerations but remains responsive to continued abnormal acceleration.

Other objects and advantages of the invention will become apparent by reference to the following specification taken in conjunction with the accompanying drawings.

In the drawings:

Fig. 3 is a horizontal cross sectional view of the switch of Fig. 1 taken on the line 3—3 of Fig. 2;

Fig. 4 is a partial cross sectional view of the switch of Fig. 1 taken on the line 4—4 of Fig. 2;

Figure 1:
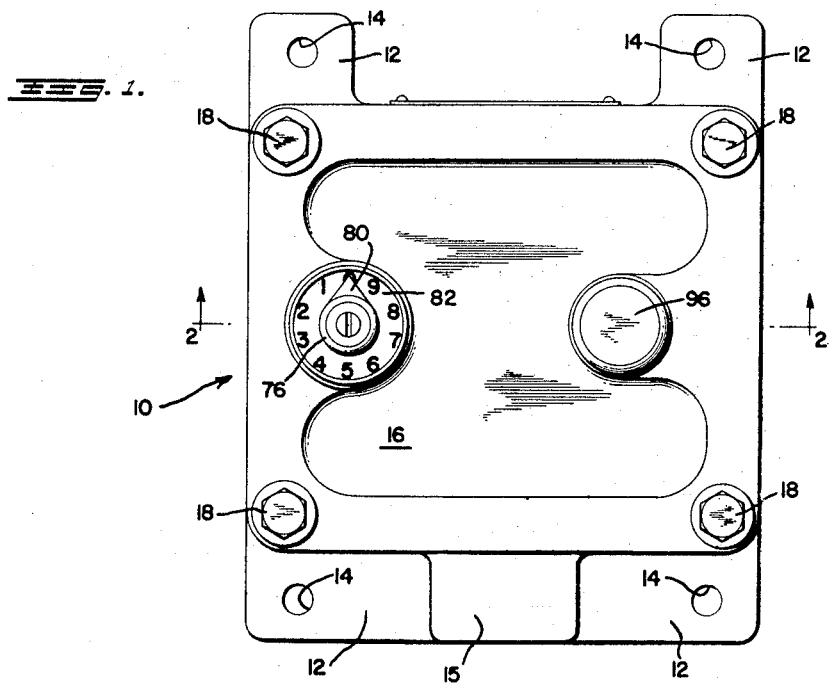
Fig. 1 is a plan view of one embodiment of acceleration responsive switch.

Referring first to the embodiment disclosed in Figs. 1 through 4, the acceleration responsive device illustrated in these figures includes a box-like frame or casing 10 provided with a plurality of mounting tabs or feet 12. Each of the feet 12 is bored as at 14 to provide a convenient means whereby casing 10 may be firmly clamped to the test structure (not shown). A conduit hub 15 of suitable construction is provided for leading electrical cable into the interior of casing 10. A cover plate 16 is secured to casing 10 to provide an enclosed compartment within casing 10 in which the operating parts of the mechanism may be disposed. Cover plate 16 is rigidly secured to casing 10 as by a plurality of bolts 18.

The operating parts of the device are mounted in the interior of casing 10 upon a base plate 20 which is rigidly secured to cover plate 16 by rigid mounting posts 22 which are rigidly connected by bolts 24 to plate 20 and cover plate 16. A sheet metal dust cover 26 provides a closed inner compartment between cover plate 16 and base plate 20.

Figure 2:
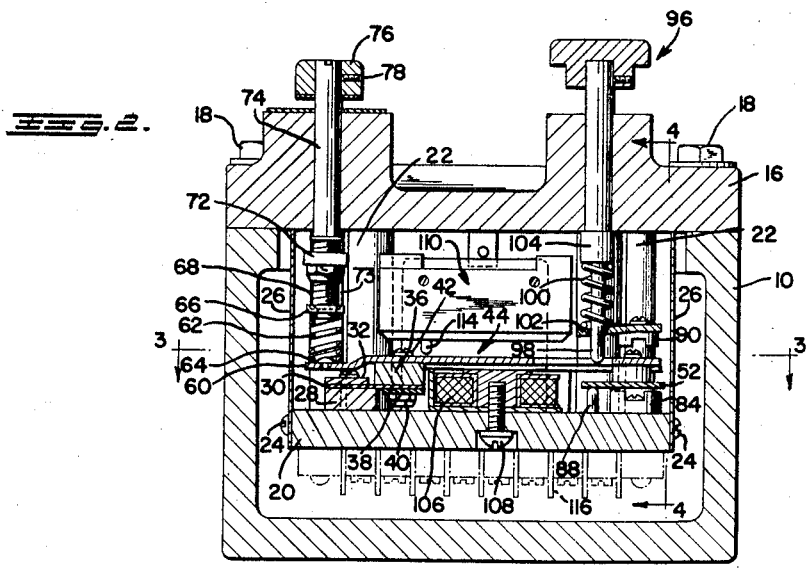
Fig. 2 is a vertical cross sectional view of the switch of Fig. 1 taken on the line 2—2 of Fig. 1.

At one end of base plate 20, a pivotal support is disposed and includes a block 28 upon which a rectangular flat sheet metal element 30 is clamped by plate 32 and bolts 34. Plate 32, as best seen in Fig. 2, overlies the major portion of element 30 on one side of its transverse center line. Bolts 34 (Fig. 3) extend through plate 32, element 30 and block 28 and are threaded into base plate 20 to rigidly secure elements 28, 30, and 32 to base plate 20. As best seen in Fig. 2, element 30 projects beyond the right-hand edge (Fig. 2) of block 28 and a second block 36 is mounted upon the upper surface of the projecting portion of element 30 by a clamping plate 38 and a nut and bolt assembly 40, 42. As seen in Fig. 2, an armature assembly generally designated 44 is clamped to the upper surface of block 36 by the nut and bolt assembly 40, 42.

The assembly described above comprises a substantially frictionless pivotal mounting for armature assembly 44 upon base plate 20. Element 30 functions primarily to prevent relative translation between blocks 28 and 36 and should not be confused with a hinge. The actual pivotal axis is one of the adjacent overlapping transverse corner edges of blocks 28 and 36, and in an imaginary situation where the only forces encountered were directed perpendicularly to the pivotal axis and the mounting plate, element 30 could be omitted.

The basic requirements of the pivotal support are that the overlapping portions of the fixed and movable element be flat and that the adjacent edges of the fixed and movable elements be straight and parallel to each other. Where the adjacent flat surfaces are in parallel or coincident planes, for example a horizontal plane, and the movable element must pivot both above and below a horizontal plane, the overlap should be kept at a minimum in order to minimize the shifting of the pivotal axis from the corner edge of one element to the corner edge of the other. In practice, the shift of the axis may be eliminated by inclining one or both of the flat surfaces or by confining movement of the movable element to one side of the plane of the fixed flat surface. In either of the last mentioned cases, the basic requirements are reduced in that only the corner edge defining the pivotal axis need be straight and only the surface which it engages need be flat. The foregoing constructions provide a line contact, hence friction is substantially absent.

Armature assembly 44 includes a main plate 46, the longitudinal edges 48 of plate 46 being flanged over to provide increased rigidity. At the distal end 50 of plate 46 an auxiliary plate 52 is secured in spaced relationship to the lower side of plate 46 as by a nut 54-bolt 56-spacer 58 assembly. At the opposite end of plate 46, an arm 60 projects rearwardly from plate 46 to engage a compression spring 62 on the opposite side of the pivotal axis of armature assembly 44 from distal end 50.

Spring 62 is maintained in position upon arm 60 by any suitable means such as by soldering at 64 upon arm 60. The opposite end of spring 62 is soldered to a cup assembly 66 which is slightly cupped to receive the sharply pointed lower end of an adjusting screw 68. Adjusting screw 68 is threaded through a nut 70 which is fixedly mounted as by welding to a flange 72 which in turn is supported on base plate 20 by rigid posts 73. Adjusting screw 68 is provided with an extended shaft 74 which is journaled in cover plate 16 and projects through the upper surface of the cover plate. At the upper end of extension 74, an adjusting knob 76 is secured as by set screw 78. Knob 76 may be provided with a pointer 80 cooperable with suitable indicia means 82 upon cover plate 16. It will be apparent that the compressive force exerted by spring 62 upon armature assembly 44 may be adjusted by turning screw 68 in nut 70 and that the magnitude of the particular setting may be ascertained from the cooperation between pointer 80 and indicia means 82. The pointed lower end of screw 68 substantially eliminates torsional friction between screw 68 and assembly 66.

A magnetic couple acting upon armature assembly 44 in opposition to the force exerted by spring 62 is established by fixedly mounting a permanent magnet 84 upon mounting plate 20 at a location in the path of movement of distal end 50 of armature assembly 44. It will be understood that armature assembly 44 will be constructed of magnetically soft materials.

Movement of armature assembly 44 about its pivotal axis is limited in the direction approaching magnet 84 by a stop 88 mounted on base plate 20 in a position where stop 88 may engage auxiliary plate 52 of armature assembly 44 to maintain a minimum air gap between armature assembly 44 and magnet 84. As best seen in Fig. 2, the rounded head of stop 88 engages armature 44 at a single point on the longitudinal center line of the armature and thereby in combination with the single degree of freedom movement required of armature assembly 44 by the pivotal support described above insures an accurate definition of the limit of approach of armature assembly 44 to magnet 84 without requiring an accurate alignment between the axis and pin. The single point contact also assures that there is no friction involved in the contact between the armature and pin 88, while the central location of pin 88 transversely of the armature assures that no torsional vibrations will be present.

Armature 44 is limited in movement away from pin 88 by engagement of plate 46 with a latching magnet 90 fixed as by bolt 92 to cross piece 94 which is bolted through posts 96 to base plate 20. Latching magnet 90 assures a positive maintenance of armature assembly 44 at this limit of movement. The combination of the holding force of the latch magnet 90 with the force of the spring 62 when armature assembly 44 is at the upper limit of movement prevents chattering of the armature after actuation under conditions of excessive vibration.

A manual reset assembly 96 is mounted in cover plate 16 at a location wherein the lower end 98 of the assembly may engage auxiliary plate 52 to manually move armature assembly 44 from a position in engagement with magnet 90 back to a position in engagement with pin 88. Reset assembly 96 is mounted for reciprocation relative to cover plate 16 and is normally biased by spring 100 to a position clear of auxiliary plate 52. Spring 100 acts between an extension 102 on cross piece 94 and a flange or enlarged diameter section 104 on assembly 96. Section 104 is also engageable with cover plate 16 to define the upper limit of movement of reset assembly 96.

In addition to manual reset assembly 96, I have provided an electromagnetic reset means taking the form of a coil 106 fixed to base plate 20 by bolt 108 at a location where coil 106, when energized, will attract armature assembly 44 into engagement with stop 88.

A snap-action switch 110 is fixedly supported from base plate 20 as by mounting frame 112 at a location where the striker 114 of switch 110 may be actuated when armature assembly 44 is in engagement with magnet 90.

The appropriate electrical connections from switch 110 and holding coil 106 to external circuits may be made at a suitably located terminal strip indicated in hidden lines at 116 on Fig. 2 and brought out from the interior of casing 10 through conduit hub 15.

The operation of the above described embodiment is as follows. For convenience in describing the operation, it will be assumed that the device is to be mounted on the test structure to provide an indication of abnormal vibration of the structure.

In such an environment, casing 10 is fixedly clamped to the structure and appropriate electrical connections are made to switch 110 whereby an indication of actuation of switch 110 may be observed. In addition, electrical connections are made for energizing holding coil 106 when desired. With the device in place upon the structure and with no vibration present, adjusting knob 76 is rotated to establish a minimum compressional force on spring 62, and armature assembly 44 is moved into engagement with stop 88 either by pressing manual reset assembly 96 or by energizing holding coil 106. Upon release of the reset means the strength of the magnetic couple between magnet 84 and armature assembly 44 exerts a constant torque sufficient to maintain armature assembly 44 in engagement with pin 88. Adjusting knob 76 is now rotated in a direction to increase the compressive force of spring 62 which applies an increasing torque tending to pivot armature assembly 44 away from stop 88. Turning of knob 76 is continued until the torque exerted by spring 62 reaches a magnitude couple between magnet 84 and armature assembly 44. Armature 44 will then pivot upwardly (Fig. 2) away from stop 88 and will continue its pivotal movement until it engages latching magnet 90. With armature 44 in engagement with latching magnet 90, switch 110 is closed to actuate the indicating means.

The foregoing position of the adjusting screw 68 establishes a reference setting for no vibratory acceleration in the chosen mounting position on the structure. It will vary with different orientations because of the effect of gravity on the armature 44. At this position of the adjusting screw the torque on the armature 44 produced by the spring 62, the gravitational force and the magnetic force produced by magnet 84 are in substantial equilibrium when the armature 44 is engaged with pin 88.

Set screw 78 on adjusting knob 76 is then loosened and the knob 76 is rotated without turning shaft 74 until the pointer 80 is aligned with the zero position.

Adjusting knob 76 is then backed off a slight amount and armature assembly 44 is reset back into engagement with stop 88. The amount by which knob 76 is backed off from the equilibrium point regulates the magnitude of the resultant force acting to maintain armature 44 on stop 88 and thereby establishes the magnitude of peak acceleration of the housing 10 required to trigger the device. Under accelerating or vibrating conditions the armature 44 when engaged with pin 88 is constrained to follow all movement of housing 10. The instantaneous inertial force produced by acceleration of the housing 10, therefore, acts to separate armature 44 from pin 88, overcoming the force produced by magnet 84 and causing the armature to move into engagement with magnet 90.

When the structure on which housing 10 is mounted vibrates, the vibratory acceleration may be simply determined by backing off the knob 76, depressing reset assembly 96 and slowly rotating knob 76 in a direction to increase the force produced by spring 62 until the device triggers. This procedure is used to determine the normal vibration and corresponding setting. To provide for actuation when abnormal vibration occurs, the knob 76 is backed off an additional amount to a desired setting and the device is reset electrically or by using the reset assembly 96. An increase in vibration of the structure will then cause the device to trigger. In use, the device is frequently mounted on large motors or motor driven pumps with the snap-action switch 110 wired into the control circuits to cause a shutdown when triggering occurs. A malfunction frequently detected is chipping of the balls of ball bearings which, if not detected promptly, would produce bearing failure and extensive damage to the pump or motor.

Figure 5:
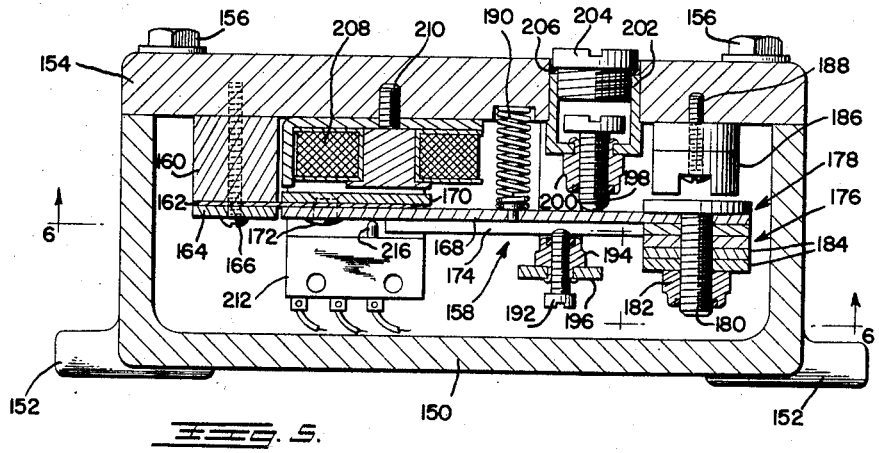
Fig. 5 is a vertical cross sectional view taken along the longitudinal center line of a second embodiment of acceleration responsive switch.
Figure 6:
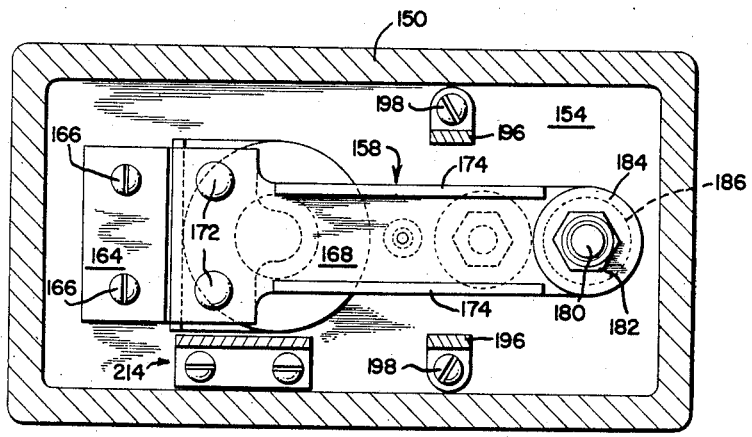
Fig. 6 is a horizontal cross sectional view of the switch of Fig. 5 taken on the line 6—6 of Fig. 5.

A modified form of the foregoing device is disclosed in Figs. 5 and 6 of the drawings. The distinction between the device of Figs. 1 through 4 and that of Figs. 5 and 6 resides primarily in the sensitivity adjustment means employed. In the Figs. 1 through 4 embodiment, an adjustable spring force was opposed to a magnetic couple having a fixed air gap, while in the Figs. 5 and 6 embodiment, a fixed spring force is opposed to a magnetic couple, the strength of which is varied by adjusting the air gap.

Referring now to Fig. 5, the device illustrated includes a casing 150 having suitable mounting means such as feet 152 similar to those disclosed in the Fig. 1 embodiment. Casing 150 is provided with a cover plate 154 which may be bolted to casing 150 to provide an enclosed compartment for the moving parts of the mechanism. As in the case of the embodiment of Figs. 1 through 4, the operating parts of the mechanism are all secured to cover plate 154 whereby the mechanism may be removed from the compartment and inspected or adjusted. A pivotal support for armature assembly 158 includes a block 160, a sheet metal element 162, and clamping plate 164. Elements 160, 162 and 164 are rigidly bolted to cover plate 154 by a pair of bolts 166. As in the case of the Figs. 1 through 4 embodiment, element 162 extends beyond the rightwardmost edge of block 160 and is clamped between the arm plate 168 of armature assembly 158 and a second clamping plate 170. Clamping plate 170, plate 162 and arm 168 are rigidly secured together in the aforementioned clamped relationship by a plurality of rivets 172. The foregoing assembly provides a substantially frictionless pivotal support for armature assembly 158 upon cover plate 154. As in the previously described embodiment, armature assembly 158 is constrained to single degree of freedom movement.

In order to provide a more rigid arm, portions 174 of the longitudinal edges of arm 168 are flanged downwardly. A mass assembly 176 is mounted at the distal end of arm 168 and includes a flat disc-like element 178 having a threaded shank 180 extending downwardly through an opening at the end of arm 168. A lock nut 182 is threaded to the lower end of shank 180 and is used to clamp a selected number of washer-like mass elements 184 between the upper surface of the nut and the lower surface of arm 168.

A permanent magnet 186 is fixedly mounted upon cover plate 154 as by a bolt 188 in the path of the distal end of arm 168. Permanent magnet 186 is operable to establish a magnetic couple with the distal end of arm 168 which acts to bias or attract the distal end of arm 168 toward the magnet.

Movement of arm 168 toward magnet 186 is resisted by a compression spring 190 supported between cover plate 154 and arm 168. The characteristic of spring 190 will of course be related to the strength of the magnetic couple so that the opposed forces exerted by the spring and magnetic couple will be in equilibrium at some location within the range of movement of arm 168. It will be noted that this relationship may be modified by changing the mass of mass assembly 176.

Pivotal movement of arm 168 away from magnet 186 is limited by set screw 192 threaded through a fixed nut 194 secured to bracket 196 which in turn is bolted as at 198 to cover plate 154.

The opposite limit of movement of arm 168 is defined by stop 198. In this embodiment the adjustment means takes the form of a threaded coupling between stop 198 and nut 200 which is fixedly supported with respect to cover plate 154 by a bushing 202. The armature engaging end of stop 198 is rounded to achieve the centrally located frictionless single point contact described above in connection with the Figs. 1 through 4 embodiment. The upper end of bushing 202 is sealed as by screw 204 and gasket 206.

An electrical reset or holding coil 208 is mounted upon cover plate 154 as by bolt 210 at a location where reset coil 208, when energized, will move armature assembly 158 into engagement with stop 198 and maintain this engagement as long as the coil is energized.

A switch 212 is also mounted upon cover plate 154 by support means 214 at a location where the striker 216 of the switch may be actuated when armature assembly 158 is in engagement with stop screw 192.

The mode of operation of the Fig. 5 embodiment is in general similar to the mode of operation of the embodiment of Figs. 1 through 4. The sensitivity adjustment procedure is the same as previously described. However, it will be noted that where the Figs. 1–4 embodiment is adjusted by adjusting the pressure force of a spring while maintaining a fixed air gap, the Fig. 5 embodiment adjusts the air gap while maintaining the compressive force of the opposing spring substantially constant. It will also be noted that the Fig. 5 embodiment may have its characteristics modified by adding or subtracting mass elements 184 from the armature to alter the equilibrium and frequency response characteristics of the device.

The employment of an adjustable stop for defining the actuated position of the armature renders the exact location of the switch striker less critical.

While no manual reset means is shown in the Figs. 5 and 6 embodiment, it will be realized that such means may be provided if desired. Where desirable, the Figs. 5 and 6 embodiment may also be provided with a latching magnet to assure positive maintenance of the armature in the actuated position as in the Figs. 1 through 4 embodiment.

From the foregoing description, it can be seen that I have provided a vibration or acceleration responsive switch mechanism wherein the components are not subject to deterioration in the ordinary sense. The sensitivity of the above described examples can be adjusted to a high degree of precision and once set, remains constant over long periods of time and repeated actuations. As stated above, the exemplary embodiments are instantaneously responsive to either transient shocks or vibrations having a magnitude greater than the sensitivity setting of the device. The various components of the device may be selected and proportioned to obtain a predetermined relationship between the calibrated means of adjustment and the peak vibratory acceleration, shock acceleration, or slowly varying acceleration, to which the device will respond. The method of adjustment employed permits the device to be used in measuring the normal vibration under operating conditions so that it may be taken into account when determining the setting for the abnormal vibration level at which a warning or shutdown is desired. As such, the devices described above find wide applications on industrial equipment. One example of an application of either of the devices described above is as a malfunction detector to initiate shut-down of a machine in case of imminent bearing failure.

In certain applications, the instantaneous response of the above devices of transient shocks and abnormal vibrations is of concern during the starting of a machine where vibration may exceed the normal value by several hundred percent and in applications where external transient shocks such as a piece of wax passing through a pump, a backfire in a gas or diesel engine, or intermittent vibrations from adjacent machines are frequently encountered. To adapt the above described devices for use in applications where frequent starting and stopping of the machine renders manual resetting unfeasible or for use in remote installations, a circuit such as that shown in Fig. 7 may be employed.

Figure 7:
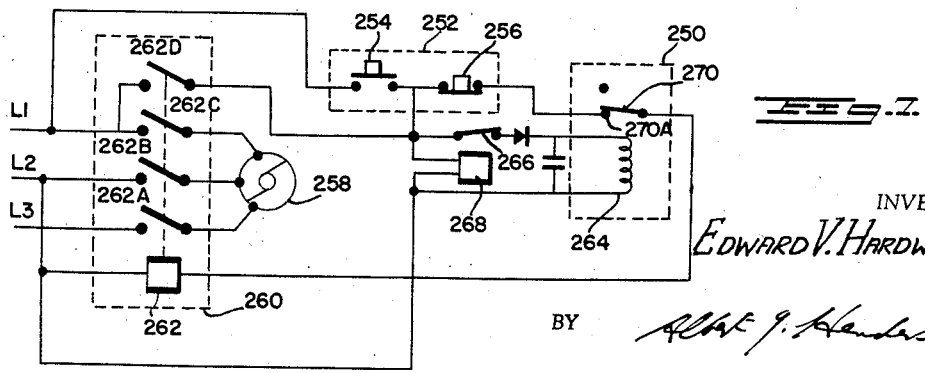
Fig. 7 is a schematic diagram of one type of electrical circuit adapted for use with the structures of Figs. 1 and 5.

The circuit of Fig. 7 includes an acceleration responsive device 250 of the type described above and a start-stop switch assembly 252 including a normally open start button 254 and a normally closed stop button 256. A conventional single speed electric motor 258 may be connected to a suitable power supply source through a starting box 260 to lines L1, L2 and L3. Starting box 260 includes a relay coil 262 operable, when energized, to simultaneously close the normally opened contacts 262A, B, C, and D, the contacts 262A, B, and C being located in the power supply lines L1, L2, and L3 in the manner shown.

Holding coil 264 of acceleration responsive device 250 is connected to be energized through contacts 266 which are normally closed but are adapted to open after relay coil 268 has been energized for a predetermined time interval. The armature actuated switch 270 of acceleration responsive device 250 is connected to complete a circuit from line L1 through stop contacts 256 to line L2 when the armature of the acceleration responsive device is in its "set" position.

Operation of the circuit of Fig. 7 is as follows. Upon depression of start button 254, a circuit across lines L1 and L2 is completed through the start button contacts and relay coil 268. Contacts 266 are normally closed and upon depression of the start button permit holding coil 264 to be energized, thereby moving the armature of the acceleration responsive device to its "set" position to move switch contact 270 into engagement with contact 270A. Closing of contact 270A completes a circuit from the start button through the normally closed stop button and relay coil 262 to line L2. Energization of relay coil 262 closes the contacts 262A, B, C, and D, the contacts 262 A, B, C energizing motor 258. Contact 262D completes a circuit which by-passes start button 254 so release of the start button will not stop the motor.

The delayed opening characteristics of contacts 266 are such that holding coil 264 remains energized for a predetermined time interval after the initial energization of relay coil 268. This time interval is selected to be of a duration such that contacts 266 will not open until motor 258 is running smoothly at the desired speed. Opening of contacts 266 de-energizes holding coil 264, but contact 270A remains closed since the acceleration responsive device armature is in its "set" position.

Figure 8:
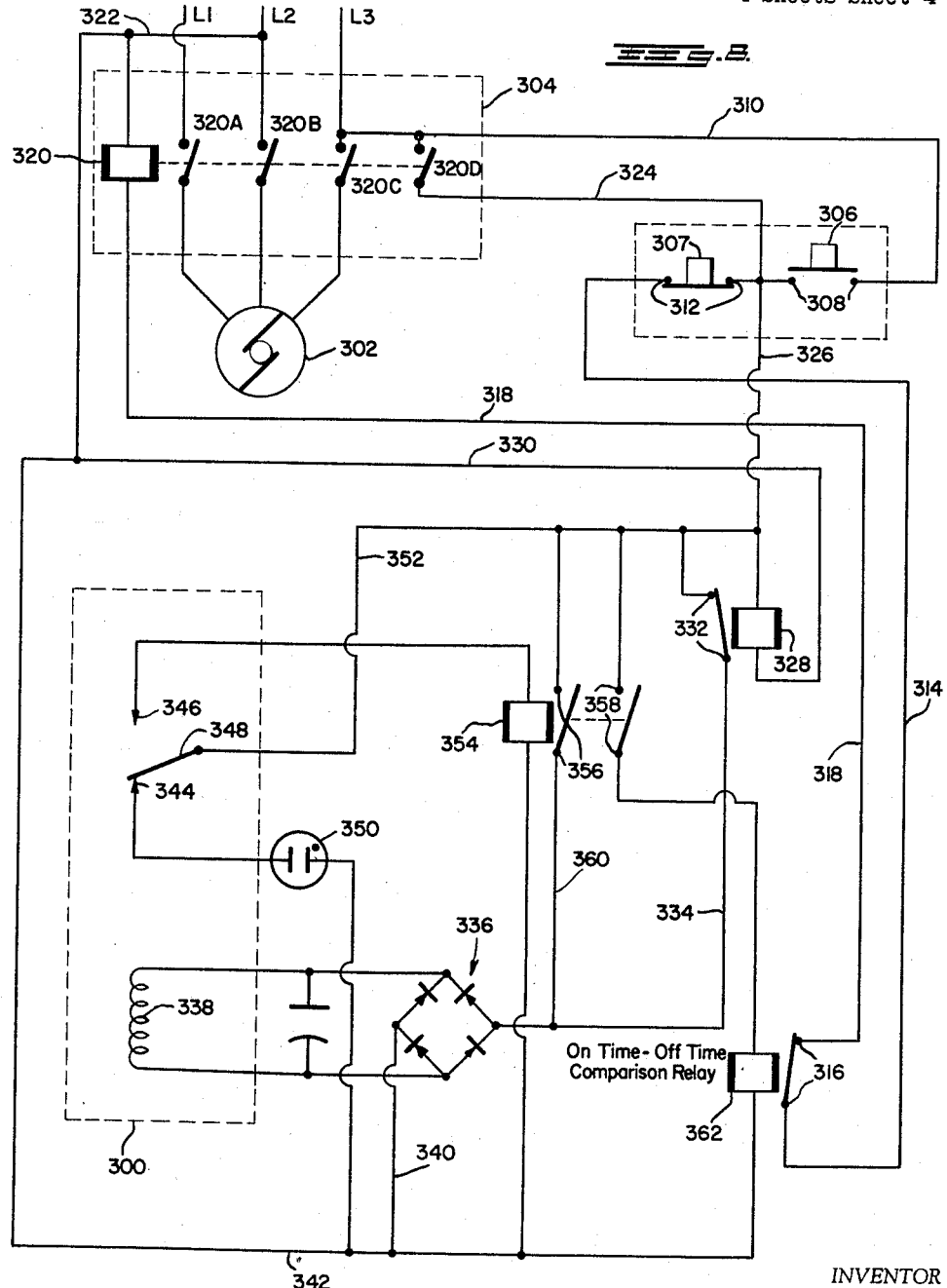
Fig. 8 is a schematic diagram of another type of electrical circuit especially adapted for use with the acceleration responsive devices of Figs. 1 and 5.

Upon sensing of an abnormal acceleration, the armature of the device 250 moves from its "set" to its actuated position, thereby opening contact 270A. Opening of contact 270A de-energizes relay 262 thereby opening contacts 262A, B, and C to motor 258 and simultaneously opening contact 262D to de-energize relay coil 268. It will be apparent that a similar effect will take place if normally closed stop button 256 is depressed.

Where external transitory shocks of the exemplary types mentioned above are encountered, a circuit such as that shown in Fig. 8 may be employed.

Referring now to Fig. 8, an acceleration responsive device of the type described above is indicated schematically at 300 and will be assumed to be mounted in a manner such that it will protect a conventional single speed drive motor 302 or a device driven by motor 302.

As shown in Fig. 8, motor 302 is supplied with electrical current from lines L1, L2, and L3 which are connected to motor 302 through a starting box 304 of any conventional construction. Start button 306 and stop button 307 are provided for manually starting and stopping drive motor 302. The description of the remaining circuit components may be most conveniently understood by describing their functions.

To start drive motor 302, start button 306 is depressed to close normally open contacts 308 and complete a circuit from line L3 to line L2 through lead 310, contacts 308, normally closed contacts 312, lead 314, normally closed contacts 316, lead 318, relay 320, and lead 322. Coil 320 is actuated to close line contacts 320A, B, C, and a supplemental contact 320D; 320A, B, and C energizing drive motor 302 and 320D by-passing start button 306 by connecting contacts 312 to line L3 through lead 324. Since start button 306 is now by-passed, it may be released. Actuation of start button 306 also energizes, through lead 326, starting lockout relay 328 which is connected to line L2 through lead 330. Relay 328 includes a pair of contacts 332 which are disposed to open when relay coil 328 is energized. Contacts 332 and relay coil 328 are related to afford a substantial delay in the opening of contacts 332 upon the energization of coil 328. The time delay involved is selected to be greater than the time duration of the abnormal starting vibrations and may, for example, be of the order of 30 seconds.

Contacts 332, when closed, complete a circuit from lead 326 through lead 334, rectifier 336 and reset coil 338 (see 106, Fig. 1 and 208, Fig. 5) to lead 340 which is constantly connected to line L2 through lead 342 and lead 322. Reset coil 338, when energized, electromagnetically maintains the armature assembly (44 of Fig. 2 or 158 of Fig. 5) in its magnetically maintained or "set" position against the respective spring bias forces and the abnormal starting vibrational accelerations. Switch (110, Fig. 2 or 212, Fig. 5) contacts 344 and 346 are connected as shown in Fig. 8 when coil 338 is energized. With the armature of the device in the "set" position, a circuit is completed from line 342 to line 326 through neon bulb 350, movable contactor 348 of the switch and lead 352. Neon bulb 350 serves to indicate that the armature is in its "set" position.

After the delayed opening of contacts 332, motor 302 is running at its normal rate, and reset coil 338 is de-energized by the opening of contacts 332. However, the armature of the switch actuating mechanism is maintained in its "set" position by a force dependent upon the sensitivity setting of the mechanism. Hence, contactor 348 of the switch remains in the position shown in Fig. 8.

Assuming that a single transient shock of a magnitude sufficient to actuate the armature of the acceleration responsive device occurs, the armature will move to its actuated position and thus engage the switch striker. This will cause movable contactor 348 to move from contact 344, opening the circuit through neon bulb 350, to contact 346, thus completing a circuit from lead 352 through relay coil 354 to lead 342. Two sets of contacts 356 and 358 are associated with relay 354 and are adapted to be closed when relay 354 is energized. Contacts 356 and 358 are closed immediately upon energization of coil 354 but are of the delayed opening type and will remain closed for a selected period after relay 354 is de-energized. As will be seen from the drawing, contacts 356 complete a circuit from lead 326 through lead 360 to lead 342 through rectifier 336, reset coil 338 and lead 340. Thus, as soon as relay 354 is energized, a circuit is completed through reset coil 338 which will return the armature to its "set" position, thus returning contactor 348 to contact 344 and thereby de-energizing relay 354.

Contacts 358, when closed, complete a circuit from lead 326 to lead 342 through an on time-off time comparison relay coil 362.

Relay device 362 may, in one form of the invention, take the form of a thermal time relay which will be actuated only after being heated to a given temperature. In the circuit shown in Fig. 8, the time interval for which current must flow through relay 362 to heat the relay to its actuating temperature is selected to be of greater duration than the time interval required for contacts 356 and 358 to open after relay coil 354 has been de-energized. With this relation between the characteristics of relay 354 and relay 362, a single transient shock will cause but a single energization of relay 354 and hence current will not flow through relay 362 for a sufficient time to heat relay 362 to energize and open contacts 316.

Where a sustained vibration is encountered, movable contactor 348 is actuated by the acceleration responsive mechanism in the same manner as if a continuous series of transient shocks were applied to the device. Hence, when a sustained vibration is applied to the device, contactor 348 will first move to contact 346, thus energizing relay 354. Relay 354 will then close contacts 356 and 358, contacts 356 completing a circuit through reset coil 338 and contacts 358 supplying a flow of current to relay 362. As soon as the holding coil is energized, it moves the armature to allow movable contactor 348 to return to contact 344, thus de-energizing relay 354. However, as stated above, contacts 356 and 358 remain closed for a predetermined time interval after relay coil 354 has been de-energized. For the purpose of explanation, it will be assumed that contacts 356 and 358 remain closed for a period of one second after coil 354 has been de-energized. Thus, reset coil 338 will remain energized and maintain the armature in its "set" position even though the vibration is continuing over the illustrative one second interval. Contacts 358 will thereby allow current to flow through coil 362 for a period of one second. As soon as contacts 356 and 358 are opened, reset coil 338 is de-energized and the vibration immediately actuates the armature again to move contactor 348 back into engagement with contact 346, thus again energizing relay 354 to again close contacts 356 and 358. The foregoing cycle is repeated until the thermal element of relay 362 is heated by the one second pulses of current to a temperature sufficient to actuate relay 362 to open contacts 316. Contacts 316 open line 318, thus de-energizing relay 320 and opening contacts 320A, B, C, and D to cut the supply to drive motor 302.

The foregoing description has assumed the existence of a continuous disturbance or vibration. In such a case, cooling of the thermal element of relay 362 which takes place during the short interval that contacts 358 are open is of little consequence because the time period during a given cycle in which contacts 358 are open is negligible compared to the one second period during which they are closed. However, the disturbance need not be a strict periodic one to actuate relay 362 because under certain conditions a series of individual shocks, occurring within a given time interval may also actuate relay 362. The general criteria for actuation of relay 362 may be best understood by the following mathematical analysis. From the following analysis, it will also be seen that the thermal relay is but one example of a means for actuating contacts 316 and that the invention in its basic sense incorporates any device which proceeds from a normal or equilibrium condition to an actuation point in accordance with the characteristics set forth in the following analysis.

In the following equations, A represents the actuation rate which is defined as the rate at which the device proceed or is driven toward its actuation point. In the thermal relay example described above, A would represent the average rate at which the device is heated during the flow of current through the element. B represents the recovery rate of the device and is defined as the rate at which the device returns from a partially actuated condition toward its normal condition. In the thermal relay example described above, B would represent the average cooling rate of the element during the period of no current flow. C represents the actuation point of the device. In the thermal relay example above, C would represent the actuation temperature of the thermal relay. $t_1$ represents the time during a single cycle of actuation during which the device is moved toward the actuation point. In the thermal relay example above, $t_1$ would represent the time within a single cycle during which contacts 358 are closed, i.e., the one second delayed opening characteristics of relay 354. $t$ represents the time of persistence of the condition sensed by the condition responsive device 300. $n$ represents the number of actuation periods occurring in a time interval $t$.

From the foregoing description, it will be seen that the device will actuate when:

(1) $\qquad Ant_1 - B(t - nt_1) \geq C$

The minimum time in which the device can actuate would be a situation where there was no recovery time (cooling in the thermal operated example) or when the B term in the above equation was zero. The B term would be zero when (2) $\qquad t - nt_1$ equals zero Since the device will be set such that there is always some recovery time, it follows that the minimum time of persistence of the abnormal condition for actuation must be greater than $nt_1$.

The maximum time for actuation would exist in a situation where the average progress toward the actuation point per cycle was a minimum positive value. From the case where the average gain toward actuation point C per cycle is zero, then $C/n$ equals zero. Dividing the left-hand side of the Equation 1 above by the number of actuations $n$ and requiring that (3) $\qquad At_1 - \dfrac{Bt}{n} + Bt_1 > 0$ since no actuation will occur if $C/n$ is equal to zero, the maximum time for actuation is found to be (4) $\qquad t < \dfrac{(A+B)nt_1}{B}$ From the foregoing analysis, it will be seen that the total time $t$ of actuation must fall within the limits indicated below.

(5) $\qquad nt_1 < t < \dfrac{(A+B)nt_1}{B}$ or (6) $\qquad \dfrac{1}{nt_1} > \dfrac{1}{t} > \dfrac{B}{(A+B)nt_1}$ which may be written more significantly as (7) $\qquad 1 > \dfrac{nt_1}{t} > \dfrac{B}{A+B}$ Equation 7 states effectively that if within a period of time $t$ contacts 358 are closed for more than $$\dfrac{B}{A+B}$$

percent of time $t$, relay contacts 316 will open.

In certain applications, as for example where the period of time over which the abnormal starting vibrations exist is not too great, relay 352 may also be employed to perform the functions of starting lock-out coil 323 and the circuit of Fig. 8 could be employed omitting lead 330, relay 328 and lead 334 and contacts 332. Obviously, the circuit would have utility in combinations other than with an electric motor.

While I have described certain exemplary embodiments of my invention, it will be apparent to those skilled in the art that the examples shown and described are capable of modification. Therefore, I wish it to be understood that the foregoing description is to be considered exemplary rather than limiting and the true scope of my invention is that defined in the following claims.

I claim:

1. A control system comprising a control device connected to perform a control function, said control device being responsive to an actuation condition at an average rate A and responsive to a recovery condition to return to an equilibrium point at an average rate B, means connected to said device to normally maintain said device in said recovery condition and to intermittently apply said actuation condition to said device for time intervals $t_1$ during the detection by said means of a control condition, said control device being actuated to perform said control function when a number $n$ applications of said actuation condition are applied to said control device within a time interval less than $$\dfrac{(A+B)nt_1}{B}$$

2. A control system comprising a condition responsive device connected to cyclically energize and de-energize a normally de-energized first circuit upon the detection of a given condition by said condition responsive device, means actuated by said first circuit to perform a control operation, said means being driven at an actuation rate A by energization of said first circuit and recovering toward a normal condition at a recovery rate B during de-energization of said first circuit, said means being actuated when within any time period $t$ said first circuit is energized for a period of time greater than $$\dfrac{Bt}{A+B}$$

3. A control system comprising a first circuit having a switch connected to energize said first circuit when in a first position and to de-energize said first circuit in a normally maintained second position, switch operating means movable from a rest position to a switch operation position in response to a control condition to thereby move said switch to said first position, reset means operable by energization of said first circuit to return said switch operating means to said rest position thereby permitting said switch to return to said second position, means for maintaining said first circuit energized for a predetermined delay period after said switch has returned to said first position, and means connected to perform a control operation when said first circuit is energized a selected minimum percentage of a time interval greater than said delay period.

4. A control system as recited in claim 3 including means independent of said first circuit for energizing said reset means for a predetermined time after said control system has been conditioned for operation.

5. A control system as recited in claim 4 wherein said means connected to perform a control operation comprise a thermally controlled relay connected in said first circuit.

6. A malfunction detection system comprising a condition responsive device connected to complete a first circuit under normal conditions and to open said first circuit upon the sensing by said device of a malfunction condition leaving a predetermined minimum magnitude, said device including means operable when energized to maintain said first circuit completed through said device, and means for maintaining said means operable energized for a predetermined time interval to render said condition responsive device insensitive to external conditions during said interval.

References Cited in the file of this patent

UNITED STATES PATENTS

| | | |
|---|---|---|
| Re. 16,661 | Kautz | June 21, 1927 |
| 2,772,379 | Schultz | Nov. 27, 1956 |